(12) United States Patent
Weng et al.

(10) Patent No.: US 8,333,497 B2
(45) Date of Patent: Dec. 18, 2012

(54) LIGHT GUIDE PLATE HAVING MICRO STRUCTURES ARRANGED IN GEOMETRIC AND STRIPE PATTERNS

(75) Inventors: Chao-Hung Weng, Hsin-Chu (TW); Tzeng-Ke Shiau, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 268 days.

(21) Appl. No.: 12/404,088

(22) Filed: Mar. 13, 2009

(65) Prior Publication Data

US 2010/0097825 A1    Apr. 22, 2010

(30) Foreign Application Priority Data

Oct. 17, 2008   (TW) ............................. 97139978 A

(51) Int. Cl.
*G02B 6/10*    (2006.01)
(52) U.S. Cl. ........ 362/625; 362/97.2; 362/628; 362/607
(58) Field of Classification Search .......... 362/623–626, 362/615, 97.1–97.3, 628, 607, 559, 560, 362/511, 330, 332
See application file for complete search history.

(56) References Cited

U.S. PATENT DOCUMENTS

| | | | |
|---|---|---|---|
| 6,612,722 | B2 | 9/2003 | Ryu et al. |
| 6,755,546 | B2 | 6/2004 | Ohkawa |
| 7,085,056 | B2 * | 8/2006 | Chen et al. ..................... 359/566 |
| 7,394,107 | B2 | 7/2008 | Ohkawa |
| 7,780,331 | B2 * | 8/2010 | Ohmori ......................... 362/620 |
| 7,845,840 | B2 * | 12/2010 | Fang et al. ..................... 362/620 |
| 2002/0181223 | A1 | 12/2002 | Ryu et al. |
| 2006/0002675 | A1 * | 1/2006 | Choi et al. ..................... 385/129 |
| 2007/0274097 | A1 * | 11/2007 | Chen et al. ..................... 362/609 |
| 2008/0130319 | A1 * | 6/2008 | Hsung et al. .................. 362/626 |
| 2009/0086509 | A1 * | 4/2009 | Omori et al. .................. 362/628 |

FOREIGN PATENT DOCUMENTS

| | | |
|---|---|---|
| CN | 101067670 A | 11/2007 |
| EP | 1544537 A1 | 6/2005 |
| JP | 1245220 A | 9/1989 |
| JP | 6099315 A | 4/1994 |
| JP | 9211230 A | 8/1997 |
| JP | 2009211231 A | 8/1997 |
| JP | 2003109418 A | 4/2003 |
| JP | 2004228018 A | 8/2004 |
| JP | 2007280952 A | 10/2007 |
| TW | M264503 | 5/2005 |

(Continued)

OTHER PUBLICATIONS

Office Action From China Patent Office in Aug. 10, 2011.

(Continued)

*Primary Examiner* — Jong-Suk (James) Lee
*Assistant Examiner* — Leah S Macchiarolo
(74) *Attorney, Agent, or Firm* — Chun-Ming Shih

(57) ABSTRACT

A light guide plate has a light emitting surface, a bottom surface opposite to the light emitting surface, a light incident surface, and a side surface opposite to the light incident surface. The light incident and side surfaces are connected between the light emitting and bottom surfaces. Light guide units are disposed on the bottom surface. Each light guide unit extends along a first direction. The first direction is towards the side surface from the light incident surface. Each light guide unit includes geometric patterns and stripe patterns for cascading the geometric patterns. Micro structures are disposed in the geometric patterns and the stripe patterns. Width of the geometric pattern along a second direction perpendicular to the first direction is greater than that of the stripe pattern. The light guide plate improves uniformity of a plane light source emitting from the light emitting surface of the light guide plate.

20 Claims, 7 Drawing Sheets

FOREIGN PATENT DOCUMENTS

| | | |
|---|---|---|
| TW | I266089 | 11/2006 |
| TW | 200736756 A | 10/2007 |
| TW | M321111 | 10/2007 |
| TW | M332872 | 5/2008 |
| TW | 594110 | 3/2009 |
| WO | WO99/06881 | 2/1999 |

OTHER PUBLICATIONS

China Official Action issued Jan. 18, 2012.
Japan Official Action issued Dec. 6, 2011.
Taiwan Official Action issued Jun. 29, 2012.

* cited by examiner

LIGHT GUIDE PLATE HAVING MICRO STRUCTURES ARRANGED IN GEOMETRIC AND STRIPE PATTERNS

BACKGROUND

1. Field of the Invention

The present invention relates to an optical plate, and particularly to a light guide plate.

2. Description of Related Art

FIG. 1 is a schematic view of a conventional light guide plate. Referring to FIG. 1, a light guide plate 2 including a plurality of cells 21 thereon is disclosed by the U.S. Pat. No. 6,612,722. Each of the cells 21 includes a plurality of micro cells 211. Moreover, the size of the cell 21 closer to a lamp 19 is smaller than the size of the cell 21 farther from the lamp 19.

Furthermore, after a light beam provided by the lamp 19 striking into the light guide plate 2, the light beam is reflected by the cells 21 and then emits from a light emitting surface of the light guide plate 2. The conventional technique controls distribution density of the cells 21 to improve uniformity of a plane light source emitting from the light emitting surface of the light guide plate 2.

However, the plurality of micro cells 211 is disposed in the cells 21, and thus the size of the cells 21 may not be reduced. This causes that the cells 21 are easily detected by human eyes.

BRIEF SUMMARY

The present invention relates to a light guide plate for improving quality of a plane light source.

To achieve at least one of the above-mentioned advantages, an embodiment of the present invention provides a light guide plate. The light guide plate has a plurality of light guide units, a plurality of micro structures, a light emitting surface, a bottom surface opposite to the light emitting surface, a light incident surface, and a side surface opposite to the light incident surface. The light incident surface and the side surface are connected between the light emitting surface and the bottom surface. The light guide units are disposed on the bottom surface, and each of the light guide units extends along a first direction wherein the first direction is towards the side surface from the light incident surface. Each of the light guide units includes a plurality of geometric patterns and a plurality of stripe patterns for cascading the geometric patterns. The micro structures are disposed in the geometric patterns and the stripe patterns. The width of the geometric pattern along a second direction is greater than the width of the stripe pattern along the second direction, wherein the second direction is perpendicular to the first direction.

In the light guide plate of the embodiment of the present invention, each of the light guide units includes the geometric patterns and the stripe patterns for cascading the geometric patterns, and the micro structures are disposed in the geometric patterns and the stripe patterns. Thus, uniformity of a plane light source emitting from the light emitting surface may be improved. Moreover, employing the stripe patterns to cascade the geometric patterns may prevent the light guide units from being detected by human eyes.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
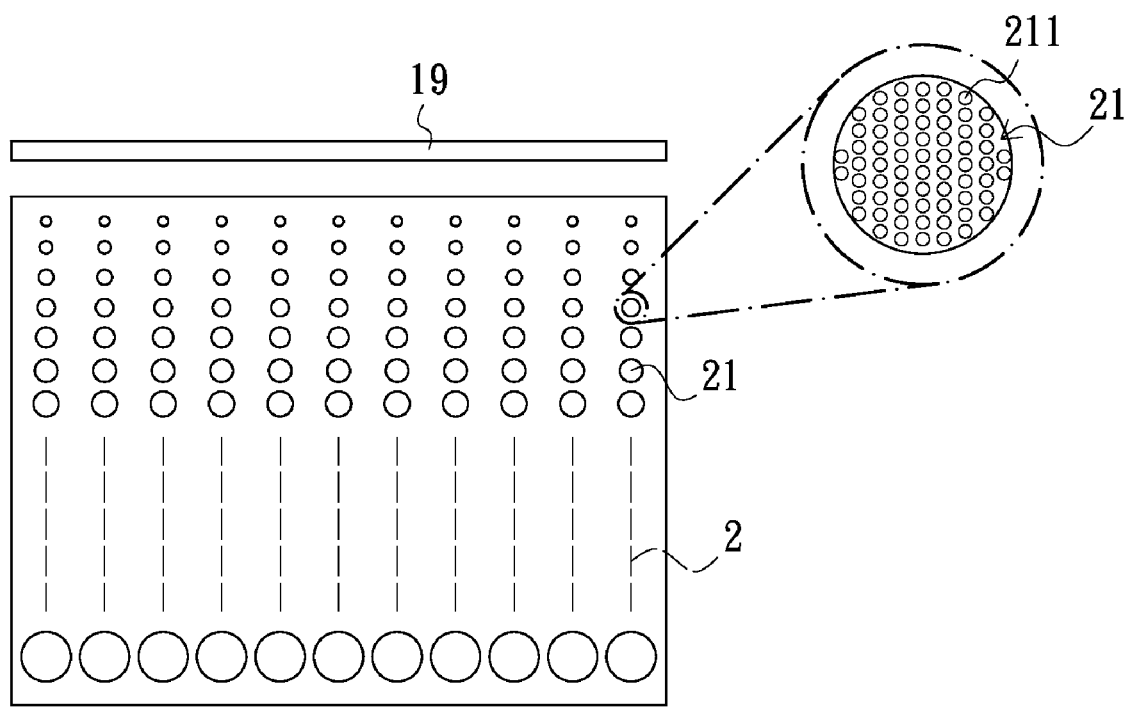
FIG. 1 is a schematic view of a conventional light guide plate.
Figure 2:
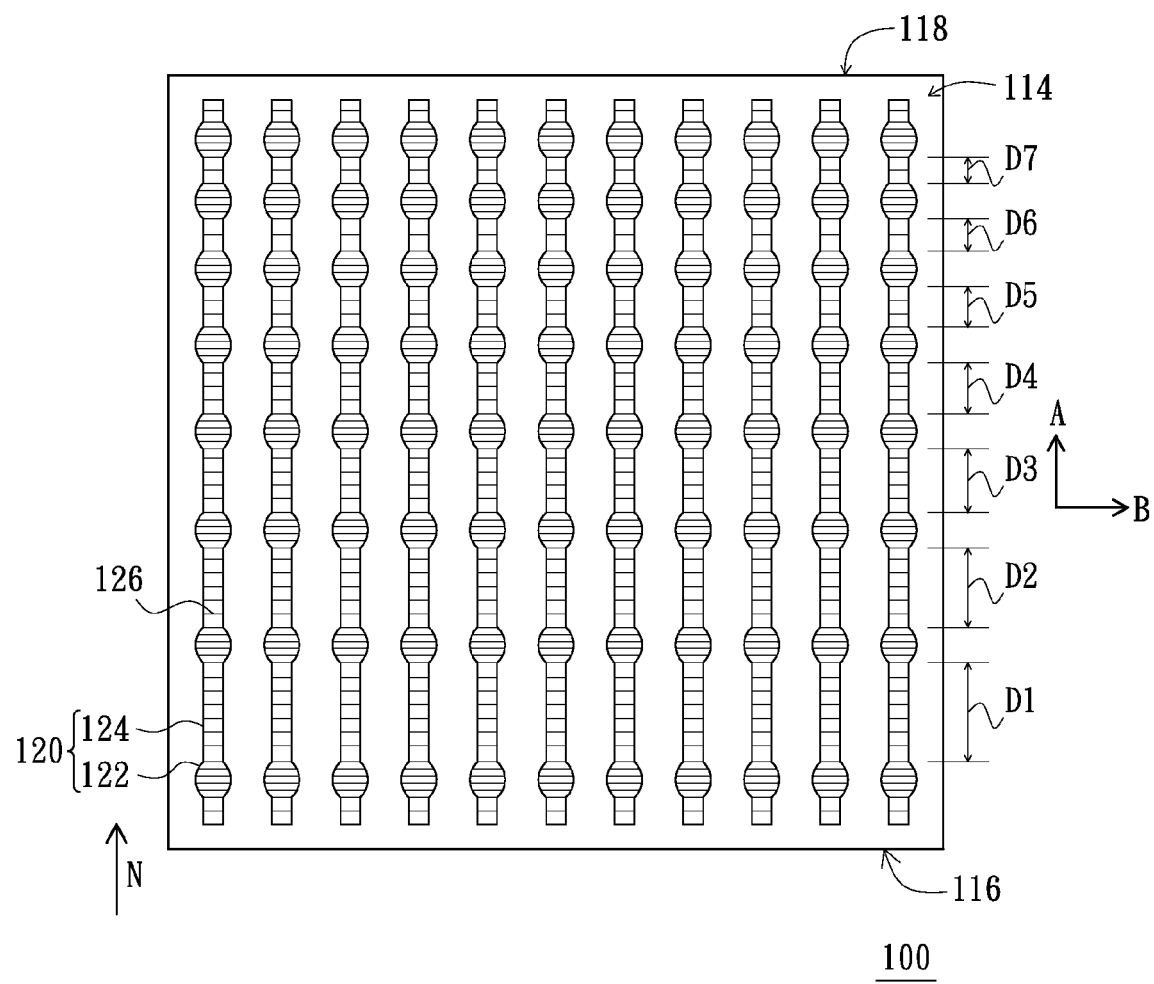
FIG. 2 is a schematic bottom view of a light guide plate of an embodiment of the present invention.

FIG. 2 is a schematic bottom view of a light guide plate of an embodiment of the present invention. Referring to FIG. 2, the light guide plate 100 of the present embodiment has a light emitting surface (not shown), a bottom surface 114 opposite to the light emitting surface, a light incident surface 116, and a side surface 118 opposite to the light incident surface 116. The light incident surface 116 and the side surface 118 are connected between the light emitting surface and the bottom surface 114. The side surface 118 may be another light incident surface. A plurality of light guide units 120 is disposed on the bottom surface 114 of the light guide plate 100 and each of light guide units 120 extends along a first direction A, wherein the first direction A is towards the side surface 118 from the light incident surface 116. Each of the light guide units 120 includes a plurality of geometric patterns 122 and a plurality of stripe patterns 124 for cascading the geometric patterns 122. A plurality of micro structures 126 is disposed in the geometric patterns 122 and the stripe patterns 124. Moreover, width of the geometric pattern 122 along a second direction B is greater than width of the stripe pattern 124 along the second direction B, wherein the second direction B is perpendicular to the first direction A.

The first direction A is, for example, parallel to a normal vector N of the light incident surface 116. Outlines of the geometric patterns 122 are, for example, circles. In another embodiment, the outlines of the geometric patterns 122 may be ellipses or polygons such as quadrilaterals or hexagons. In the present embodiment, the geometric patterns 122 of each of the light guide units 120 have same size. There is an interval between each adjacent two of the geometric patterns 122 of each of the light guide units 120. The intervals D1, D2, D3, D4, D5, D6, and D7 of each of the light guide units 120 may be different. More specifically, the intervals D1, D2, D3, D4, D5, D6, and D7 of each of the light guide units 120 are gradually reduced along the first direction A. In other words, D1>D2>D3>D4>D5>D6>D7.

Figure 3:
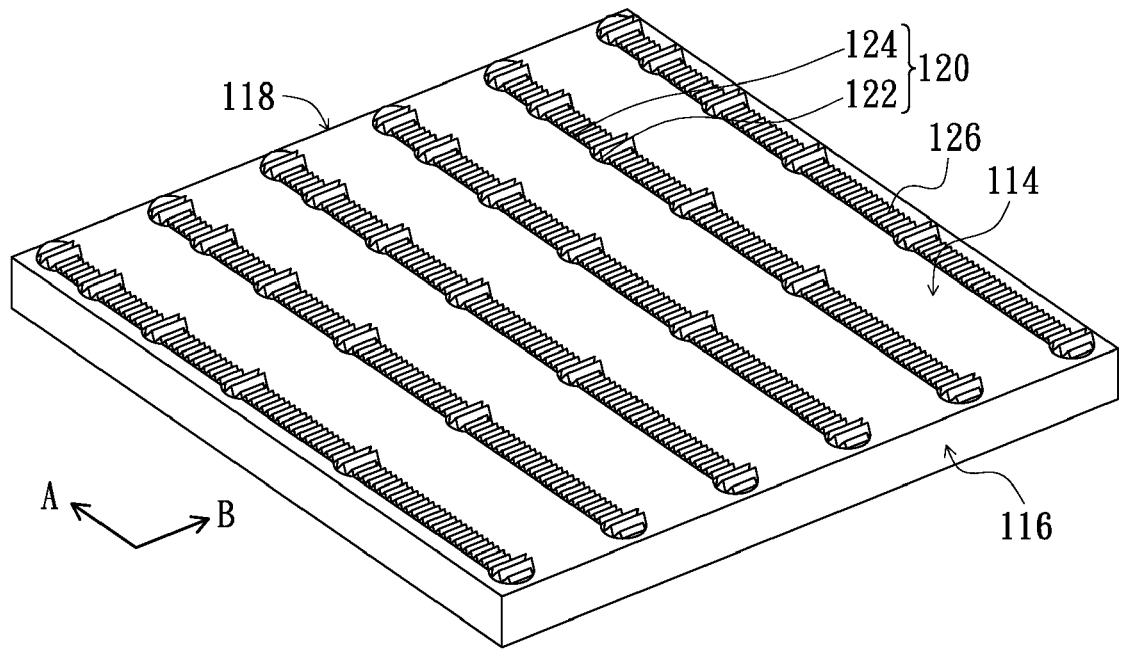
FIG. 3 is a schematic three-dimensional view of a light guide plate of another embodiment of the present invention.
Figure 4:
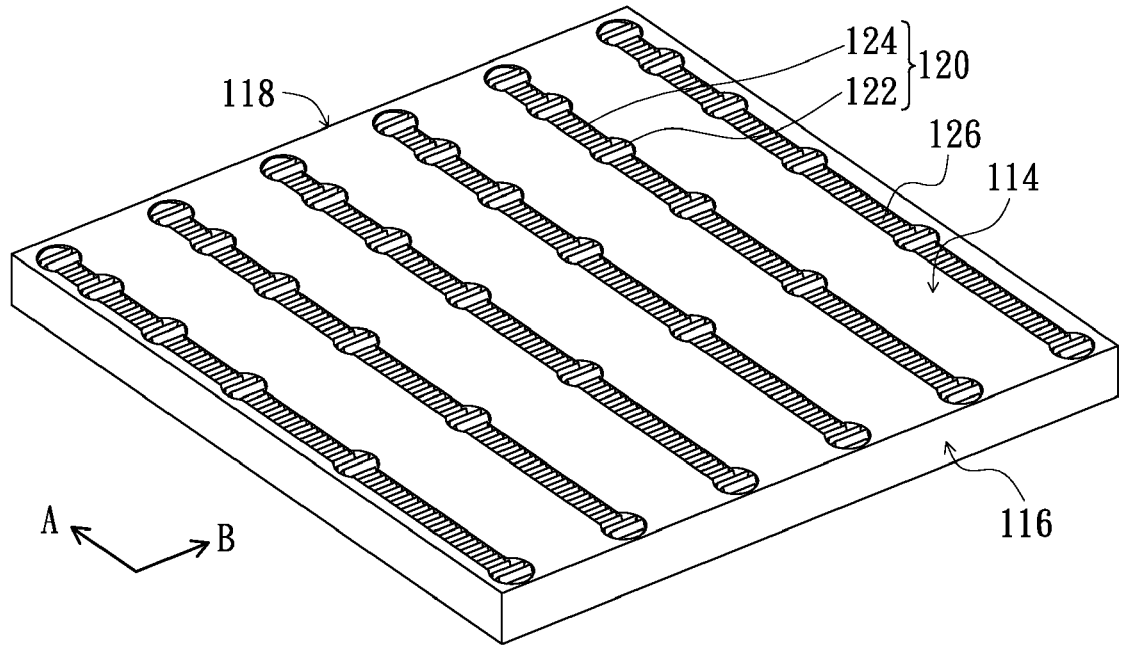
FIG. 4 is a schematic three-dimensional view of a light guide plate of another embodiment of the present invention.

The geometric patterns 122 and the stripe patterns 124 may be flat patterns, and the micro structures 126 may be protruded from the geometric patterns 122 and the stripe patterns 124 (as shown in FIG. 3) or concaved from the geometric patterns 122 and the stripe patterns 124 (as shown in FIG. 4). Moreover, the micro structures 126 of each of light guide units 120 are, for example, arranged along the first direction A. The micro structures 126 of each of light guide units 120 are, for example, linked together. In another embodiment, the micro structures 126 of each of light guide units 120 may be separately arranged. In FIG. 3, the micro structures 126 are, for example, V-shape protrusions. In another embodiment, the micro structures 126 may be semi-cylindrical protrusions, spherical protrusions, pyramid protrusions or the combination of the above-mentioned protrusions. Furthermore, in FIG. 4, the micro structures 126 are, for example, V-shape grooves. In another embodiment, the micro structures 126 may be semi-cylindrical grooves, spherical concaves, pyramid concaves or the combination of the above-mentioned concaves and grooves.

Figure 5:
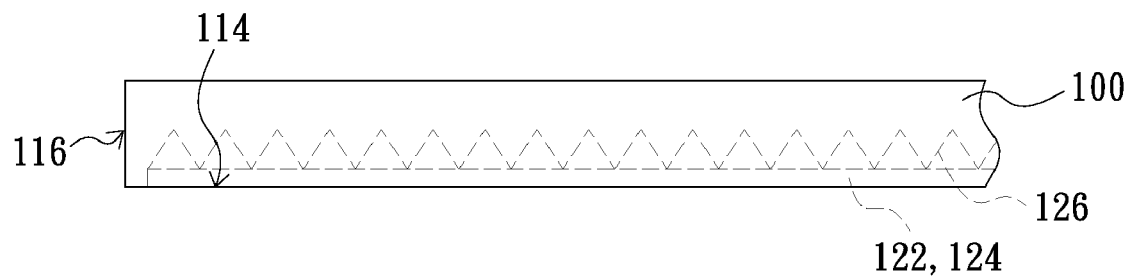
FIG. 5 is a schematic side view of a light guide plate of another embodiment of the present invention.

Referring to FIG. 5, the geometric patterns 122 and the stripe patterns 124 may be concaved from the bottom surface 114, and the micro structures 126 may be concaved from the geometric patterns 122 and the stripe patterns 124. Moreover, the micro structures 126 are, for example, V-shape grooves. In another embodiment, the micro structures 126 may be semi-cylindrical grooves, spherical concaves, pyramid concaves or the combination of the above-mentioned concaves and grooves.

Figure 6:
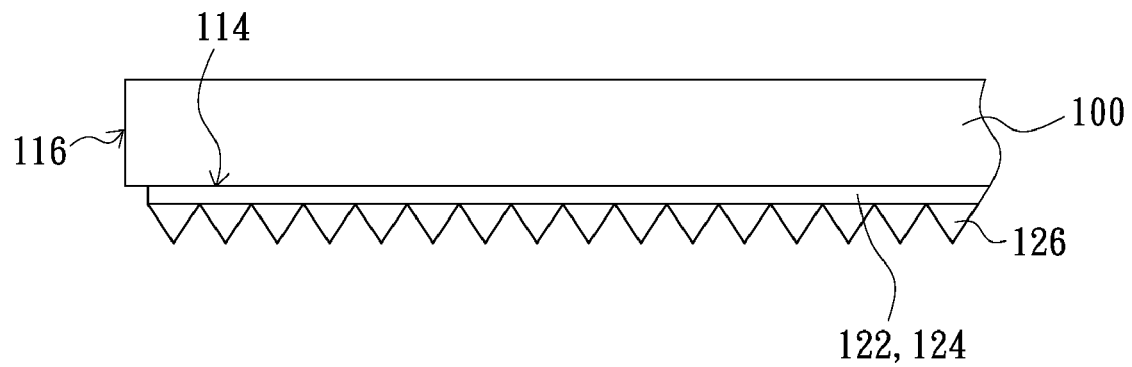
FIG. 6 is a schematic side view of a light guide plate of another embodiment of the present invention.

Referring to FIG. 6, the geometric patterns 122 and the stripe patterns 124 may be protruded from the bottom surface 114, and the micro structures 126 may be protruded from the geometric patterns 122 and the stripe patterns 124. Moreover, the micro structures 126 are, for example, V-shape protrusions. In another embodiment, the micro structures 126 may be semi-cylindrical protrusions, spherical protrusions, pyramid protrusions or the combination of the above-mentioned protrusions.

Figure 7:
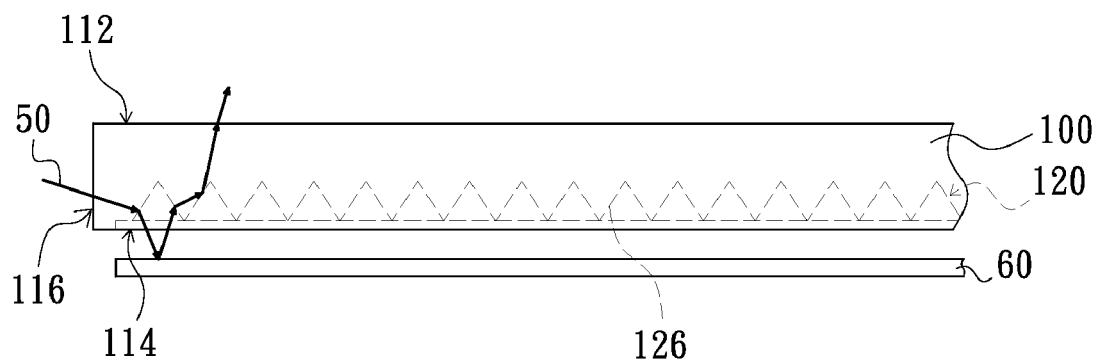
FIG. 7 is a schematic view showing a transmission path of a light beam in the light guide plate of FIG. 5.

FIG. 7 is a schematic view showing a transmission path of a light beam in the light guide plate of FIG. 5. Referring to FIG. 7, a portion of a light beam 50 striking from the light incident surface 116 is refracted to a reflecting sheet 60 under the light guide plate 100 by the micro structures 126 of the light guide units 120. Afterward, the reflecting sheet 60 reflects the portion of light beam 50 into the light guide units 120, and then the light beam 50 is refracted and reflected by the micro structures 126 and finally emits from the light emitting surface 112, such that the light emitting angle of the light beam 50 is reduced and the brightness is consequently improved. Furthermore, referring to FIGS. 2 and 7, due to each of the light guide units 120 of the light guide plate 100 including the stripe patterns 124 for cascading the geometric patterns 122, the light beam 50 not only may emit from areas of the light emitting surface 112 right above the geometric patterns 122, but also may emit from areas of the light emitting surface 112 right above the stripe patterns 124. Therefore, light emitting uniformity of light guide plate 100 is improved, and this may prevent the light guide units 120 from being detected by human eyes.

Figure 8:
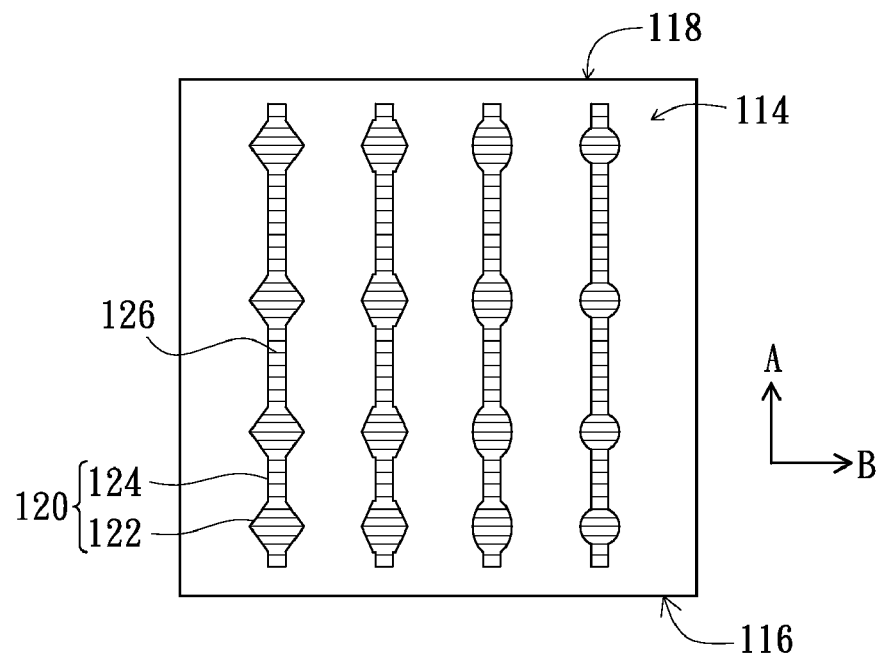
FIG. 8 is a schematic bottom view of a light guide plate of another embodiment of the present invention.
Figure 9:
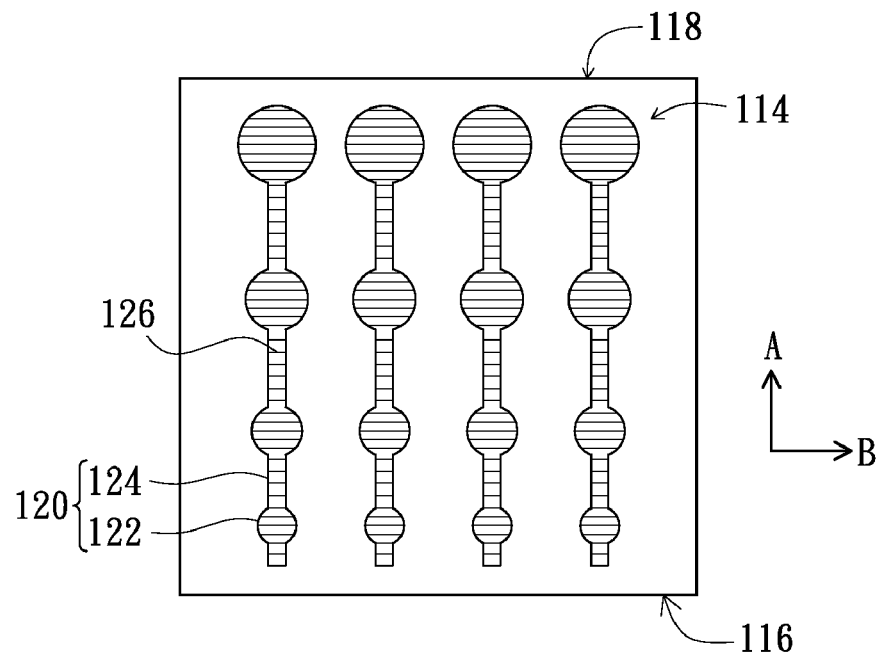
FIG. 9 is a schematic bottom view of a light guide plate of another embodiment of the present invention.
Figure 10:
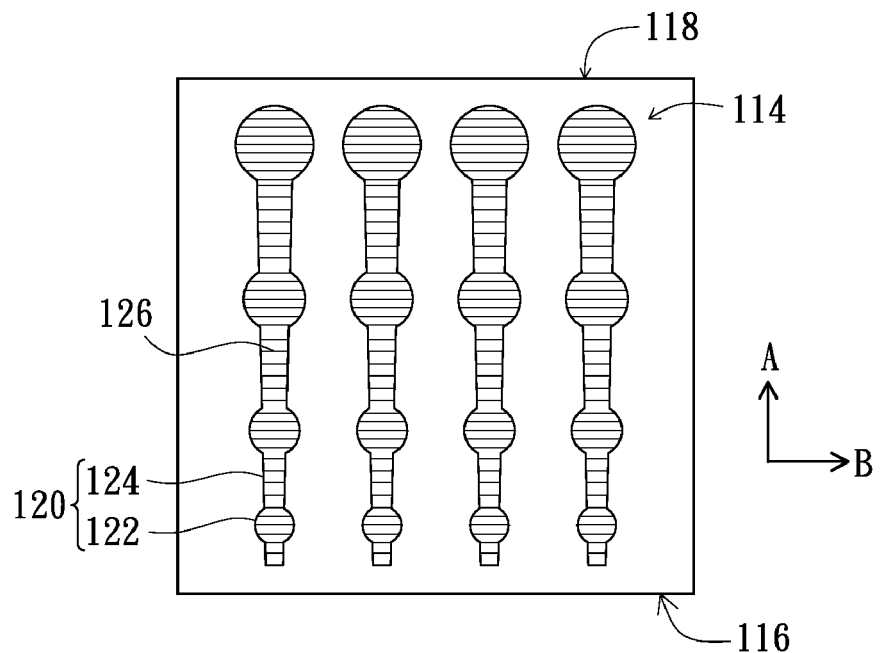
FIG. 10 is a schematic bottom view of a light guide plate of another embodiment of the present invention.

It should be noted that although the outlines of the geometric patterns 122 of the light guide plate 100 of FIG. 2 are the same, in another embodiment (as shown in FIG. 8), the outlines of the geometric patterns 122 may be the combination of circles, ellipses, and polygons such as quadrilaterals or hexagons. Moreover, referring to FIG. 9, the sizes of the geometric patterns 122 of each of the light guide units 120 may be different. For example, the sizes of the geometric patterns 122 of each of the light guide units 120 are gradually increased along the first direction A. Referring to FIG. 10, the stripe pattern 124 of each of the light guide units 120 may be gradually expanded along the first direction A.

Figure 11:
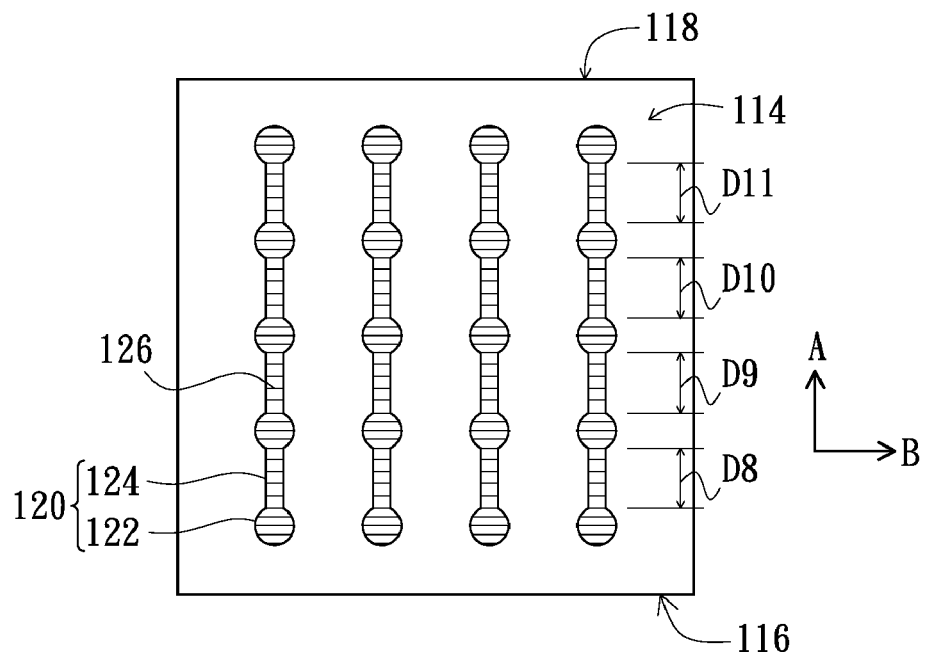
FIG. 11 is a schematic bottom view of a light guide plate of another embodiment of the present invention.
Figure 12:
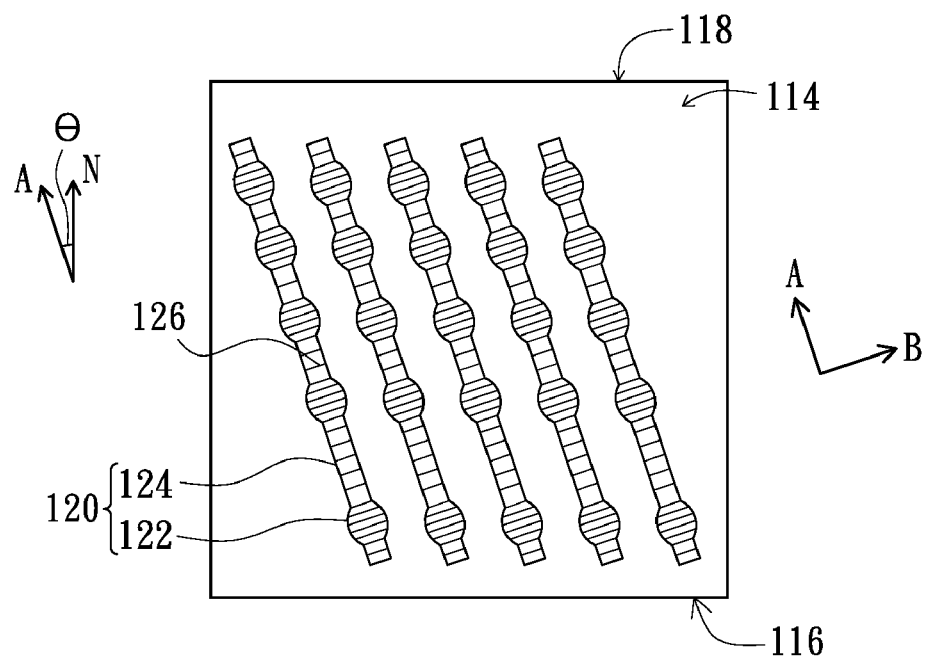
FIG. 12 is a schematic bottom view of a light guide plate of another embodiment of the present invention.

Referring to FIG. 11, there is an interval between each adjacent two of the geometric patterns 122 of each of the light guide units 120. The intervals D8, D9, D10, and D11 of each of the light guide units 120 may be the same. Referring to FIG. 12, each of the light guide units 120 extends along the first direction A, wherein the first direction A is towards the side surface 118 from the light incident surface 116 and there may be an included angle θ between the first direction A and the normal vector N of the light incident surface 116.

Figure 13:
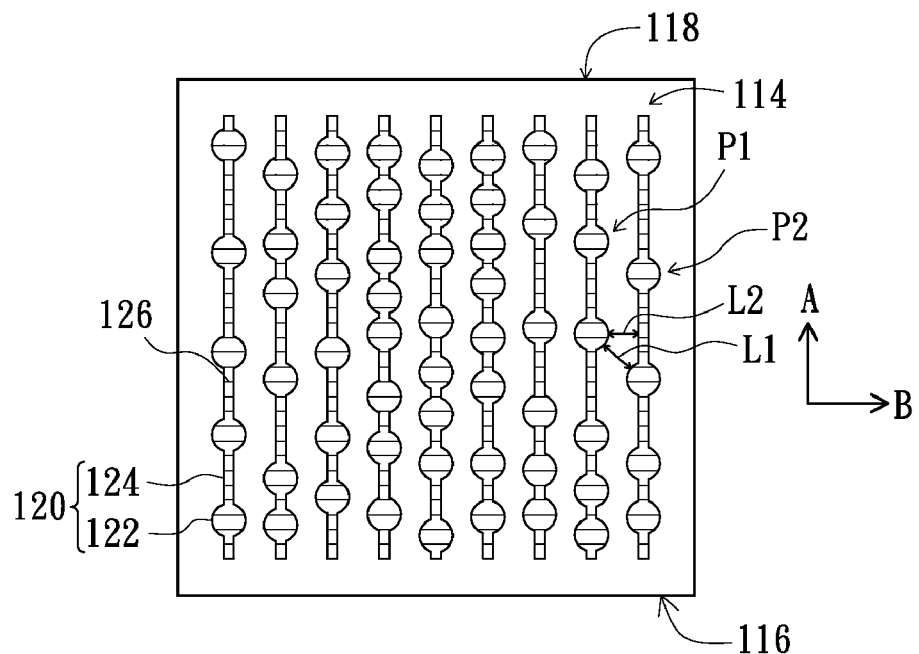
FIG. 13 is a schematic bottom view of a light guide plate of another embodiment of the present invention.

Referring to FIG. 13, the geometric patterns 122 of the light guide units 120 of the light guide plate 100 may be randomly arranged, and distribution density of the geometric patterns 122 may be adjusted according to different requirements. For example, the distribution density of the geometric patterns 122 at a center area of the bottom surface 114 may be greater than that of the geometric patterns 122 at the other areas of the bottom surface 114. Due to the arrangement of the stripe patterns 124, most of the shortest distances between each of the geometric patterns 122 and the adjacent light guide units 120 may be reduced. For example, when the stripe patterns 124 are not arranged, the shortest distance between the geometric pattern 122 indicated by an arrow P1 and the light guide unit 120 at right side of the geometric pattern 122 indicated by the arrow P1 is the distance L1 between the geometric pattern 122 indicated by the arrow P1 and the geometric pattern 122 indicated by an arrow P2. When the stripe patterns 124 are arranged, the shortest distance between the geometric pattern 122 indicated by the arrow P1 and the light guide unit 120 at right side of the geometric pattern 122 indicated by the arrow P1 is the distance L2 between the geometric pattern 122 indicated by the arrow P1 and the stripe pattern 124 at right side of the geometric pattern 122 indicated by the arrow P1, wherein the distance L2 is smaller than the distance L1. In other words, when the stripe patterns 124 are arranged, the shortest distance between the geometric pattern 122 indicated by the arrow P1 and the light guide unit 120 at right side of the geometric pattern 122 indicated by the arrow P1 is reduced to L2. Because the shortest distances between the geometric patterns 122 and the adjacent light guide units 120 may be reduced, brightness at areas of the light emitting surface right above the geometric patterns 122 may be similar to brightness at areas of the light emitting surface right above the adjacent light guide units 120, and thus the light emitting uniformity of the light guide plate 100 may be improved.

In summary, each of the light guide plates of the embodiments of the present invention has at least one of following advantages:

1. Each of light guide units includes the geometric patterns and the stripe patterns for cascading the geometric patterns, and the micro structures for refracting and reflecting the light beam are disposed in the geometric patterns and stripe patterns, so the light guide plate of each of the embodiments of the present invention may improve uniformity of the plane light source emitting from the light emitting surface.

2. Employing the stripe patterns to cascade the geometric patterns may prevent the light guide units from being detected by human eyes.

3. The distribution density of the geometric patterns of the light guide plate may be adjusted according to different requirements.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate comprising a plurality of light guide units, a plurality of micro structures, a light emitting surface, a bottom surface opposite to the light emitting surface, a light incident surface, and a side surface opposite to the light incident surface, the light incident surface and the side surface being connected between the light emitting surface and the bottom surface, the light guide units being disposed on the bottom surface, each of the light guide units extending along a first direction, the first direction being towards the side surface from the light incident surface, each of the light guide units comprising a plurality of geometric patterns and a plurality of stripe patterns for cascading the geometric patterns such that the geometric patterns and the stripe patterns are alternately disposed on the bottom surface and connected to each other, each of the stripe patterns in each of the light guide units being separated from each other along the first direction by one geometric pattern, the micro structures being disposed in the geometric patterns and the stripe patterns, the width of the geometric pattern along a second direction being greater than the width of the stripe pattern along the second direction, the second direction being perpendicular to the first direction, and the micro structures in the geometric patterns and the stripe patterns being arranged along the first direction.

2. The light guide plate as claimed in claim 1, wherein the geometric patterns and the stripe patterns are concaved from the bottom surface, the micro structures are concaved from the geometric patterns and the stripe patterns.

3. The light guide plate as claimed in claim 2, wherein the micro structures are selected from the group consisting of V-shape grooves, semi-cylindrical grooves, spherical concaves, and pyramid concaves.

4. The light guide plate as claimed in claim 1, wherein the micro structures of each of the light guide units are linked together.

5. The light guide plate as claimed in claim 1, wherein the geometric patterns and the stripe patterns are flat patterns, the micro structures are concaved from the geometric patterns and the stripe patterns.

6. The light guide plate as claimed in claim 5, wherein the micro structures are selected from the group consisting of V-shape grooves, semi-cylindrical grooves, spherical concaves, and pyramid concaves.

7. The light guide plate as claimed in claim 1, wherein the geometric patterns and the stripe patterns are protruded from the bottom surface, the micro structures are protruded from the geometric patterns and the stripe patterns.

8. The light guide plate as claimed in claim 1, wherein the geometric patterns and the stripe patterns are flat patterns, the micro structures are protruded from the geometric patterns and the stripe patterns.

9. The light guide plate as claimed in claim 1, wherein outlines of the geometric patterns are selected from the group consisting of circles, ellipses, and polygons.

10. The light guide plate as claimed in claim 1, wherein the stripe pattern gets wider the further from the light incident surface.

11. The light guide plate as claimed in claim 1, wherein the first direction is parallel to a normal vector of the light incident surface.

12. The light guide plate as claimed in claim 1, wherein there is an included angle between the first direction and a normal vector of the light incident surface.

13. The light guide plate as claimed in claim 1, wherein the geometric patterns of each of the light guide units have same size.

14. The light guide plate as claimed in claim 1, wherein the geometric patterns of each of the light guide units have different sizes.

15. The light guide plate as claimed in claim 14, wherein sizes of the geometric patterns of each of the light guide units are gradually increased along the first direction.

16. The light guide plate as claimed in claim 1, wherein there is an interval between each adjacent two of the geometric patterns of each of the light guide units, and the intervals of each of the light guide units are the same.

17. The light guide plate as claimed in claim 1, wherein there is an interval between each adjacent two of the geometric patterns of each of the light guide units, and the intervals of each of the light guide units are different.

18. The light guide plate as claimed in claim 17, wherein there is an interval between each adjacent two of the geometric patterns of each of the light guide units, and the intervals of each of the light guide units are gradually reduced along the first direction.

19. The light guide plate as claimed in claim 17, wherein the geometric patterns of the light guide units are randomly arranged.

20. The light guide plate as claimed in claim 1, wherein the micro structures of each of the light guide units are prismatic grooves.

* * * * *